United States Patent
Song et al.

(10) Patent No.: US 9,712,403 B2
(45) Date of Patent: Jul. 18, 2017

(54) METHOD FOR PROVIDING NODE INFORMATION, METHOD FOR ACQUIRING NODE INFORMATION, AND DEVICE

(71) Applicant: Huawei Device Co., LTD, Shenzhen (CN)

(72) Inventors: Yue Song, Shenzhen (CN); Haitao Liu, Beijing (CN); Xinmiao Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 14/248,937

(22) Filed: Apr. 9, 2014

(65) Prior Publication Data

US 2014/0223008 A1    Aug. 7, 2014

Related U.S. Application Data

(63) Continuation of application No. 13/249,625, filed on Sep. 30, 2011, now Pat. No. 8,745,190, which is a
(Continued)

(30) Foreign Application Priority Data

Apr. 1, 2009   (CN) .......................... 2009 1 0132988
Jun. 22, 2009  (CN) .......................... 2009 1 0146271

(51) Int. Cl.
*G06F 15/173* (2006.01)
*H04L 12/26* (2006.01)
(Continued)

(52) U.S. Cl.
CPC .............. *H04L 43/04* (2013.01); *H04L 12/24* (2013.01); *H04L 12/2424* (2013.01); *H04W 4/001* (2013.01); *G06F 8/65* (2013.01)

(58) Field of Classification Search
CPC . H04L 12/2424; H04L 41/08; H04L 41/0803; H04L 41/0813
(Continued)

(56) References Cited

U.S. PATENT DOCUMENTS 8,209,676 B2    6/2012  Kapadekar et al.
8,214,824 B2 *  7/2012  Ookuma .................. G06F 8/65
                                                      717/172
(Continued)

FOREIGN PATENT DOCUMENTS

CN    1625865 A    6/2005
CN    1885986 A    12/2006
(Continued)

OTHER PUBLICATIONS

Black, D., et al., "Uniform Resource Identifier (URI) Scheme for the Simple Network Management Protocol (SNMP)," Internet Engineering Task Force, Network Working Group, Internet Draft, Dec. 2004, 18 pages.
(Continued)

*Primary Examiner* — Kristie Shingles
(74) *Attorney, Agent, or Firm* — Slater Matsil, LLP

(57) ABSTRACT

A method provides node information. A command for requesting node information associated with a target node is received. The command includes a Management Object Identifier (MOI) and node object information associated with the target node. The node information associated with the target node is sent according to the MOI and the node object information in the command.

15 Claims, 9 Drawing Sheets

Related U.S. Application Data continuation of application No. PCT/CN2010/071492, filed on Apr. 1, 2010.

(51) Int. Cl.
*H04L 12/24* (2006.01)
*H04W 4/00* (2009.01)
*G06F 9/445* (2006.01)

(58) Field of Classification Search
USPC ........................................ 709/220, 223, 224
See application file for complete search history.

(56) References Cited

U.S. PATENT DOCUMENTS

| | | | | |
|---|---|---|---|---|
| 8,613,062 | B2* | 12/2013 | Chai | H04L 12/24 726/4 |
| 8,732,280 | B2* | 5/2014 | Song | H04L 41/0213 709/220 |
| 2001/0023509 | A1 | 9/2001 | Becker et al. | |
| 2003/0204640 | A1 | 10/2003 | Sahinoja et al. | |
| 2006/0190608 | A1 | 8/2006 | Sahinoja et al. | |
| 2007/0106770 | A1* | 5/2007 | Alnas | H04L 41/0233 709/223 |
| 2007/0294385 | A1* | 12/2007 | Kapadekar | G06F 8/65 709/223 |
| 2009/0094363 | A1* | 4/2009 | He | H04L 41/0213 709/224 |
| 2010/0271058 | A1 | 10/2010 | Kitai et al. | |
| 2010/0299739 | A1* | 11/2010 | Chai | H04L 12/24 726/9 |
| 2010/0325201 | A1 | 12/2010 | Chitturi et al. | |
| 2011/0231537 | A1* | 9/2011 | Song | H04L 41/0213 709/223 |
| 2011/0238806 | A1* | 9/2011 | Bhat | H04L 29/12566 709/223 |
| 2012/0210315 | A1* | 8/2012 | Kapadekar | G06F 8/65 717/172 |

FOREIGN PATENT DOCUMENTS

| | | |
|---|---|---|
| CN | 101083608 A | 12/2007 |
| CN | 101123794 A | 2/2008 |
| CN | 101778486 A | 7/2010 |
| EP | 0977400 A1 | 2/2000 |
| WO | 2006018707 A1 | 2/2006 |

OTHER PUBLICATIONS

Black, D., et al., "Uniform Resource Identifier (URI) Scheme for the Simple Network Management Protocol (SNMP)," The Internet Society, Network Working Group, Standards Track, Jun. 2005, 18 pages.

Black, D., et al., "URI Scheme for SNMP," Internet Engineering Task Force, Network Working Group, Internet Draft, Feb. 2004, 12 pages.

Extended European Search Report received in Application No. 10758061.5-1244 mailed Dec. 22, 2011, 6 pages.

First Chinese Office Action and partial translation received in Chinese Application No. 200910146271.7, mailed Jul. 3, 2012, 12 pages.

International Search Report and Written Opinion received in Application No. PCT/CN2010/071492 mailed Jul. 8, 2010, 14 pages.

Notice of Allowance issued in U.S. Appl. No. 13/249,625 mailed Jan. 10, 2014, 13 pages.

OMA Device Management Tree and Description, Draft Version 1.3—Jan. 12, 2009, Open Mobile Alliance, OMA-TS-DM_TND-V1_3-20090112-D, 48, pages.

Second Office Action of Chinese Application No. 200910146271.7, mailed Mar. 12, 2013, 14 pages. (Partial Translation).

United States Office Action received in U.S. Appl. No. 13/249,625 mailed Jul. 17, 2013, 14 pages.

* cited by examiner

METHOD FOR PROVIDING NODE INFORMATION, METHOD FOR ACQUIRING NODE INFORMATION, AND DEVICE

This application is a continuation U.S. patent application Ser. No. 13/249,625, filed on Sep. 30, 2011, which is a continuation of International Application No. PCT/CN2010/071492, filed on Apr. 1, 2010, which claims priority to Chinese Patent Application No. 200910132988.6, filed on Apr. 1, 2009 and Chinese Patent Application No. 200910146271.7, filed on Jun. 22, 2009, all of which are hereby incorporated by reference in their entireties.

TECHNICAL FIELD

The present invention relates to the field of communications technologies, and in particular, to a method and apparatus for providing node information.

BACKGROUND

The Device Management (DM) specification "OMA DM V1.2" formulated by the Open Mobile Alliance Device Management Work Group (OMA DM WG) is used by a third party to manage and set environment and configuration information of a terminal device (for example, a mobile phone terminal and a function object in a terminal), so as to solve a problem existing in use of the terminal device. For example, an operation such as installation and an upgrade of software and firmware is performed in an Over The Air (OTA) mode, and a service being more human-centered and personalized is provided, thereby improving user experience. The third party may be an operator, a service provider, or an information management department of a partner.

The environment and configuration information of the terminal device is saved in a DM tree. The DM tree includes some Management Objects (MOs). The DM tree is formed from nodes, for example, a root node, an interior node, and a leaf node. The root node is the topmost node in the DM tree; the leaf node may have a node value but cannot have a child node; the interior node cannot have a node value, but can have a child node.

The DM and a relevant application protocol define a data model of an MO, that is, a structure of nodes, descriptions of nodes and related properties. For example, the Device Capability MO (DCMO) protocol defines an MO for managing capabilities of a device. In a specific application, the MO needs to be instantiated in a terminal, that is, nodes are assigned with values and names to generate an actual MO instance that is stored in the DM tree so as to being managed by a DM server and used by a terminal device.

When the data model of the MO is defined, one kind of node, that is, an unnamed node, is defined to act as a placeholder. The node is named only when the DM server or the terminal device instantiates the node, and a node of this type is called an x node.

The DM tree may be regarded as an interface for the DM server to manage the terminal device. The DM server communicates with a DM client in the terminal device through a DM protocol to manage the terminal device. The DM server operates and controls the MO in the DM tree through an operation command such as Get, Replace, Exec, Copy, and Delete. A node of the MO is addressed through a Uniform Resource Identifier (URI) such as ".A/B/C/D".

In the prior art, the DM server first searches for a position of the MO in the DM tree by locally resolving a Device Description Framework (DDF) or acquires the position of the MO from the terminal device by sending a Management Object Identifier (MOI), and then acquires node information such as structure information and data information (including a node property and a node value) in an MO instance from the terminal device according to the acquired position.

SUMMARY OF THE INVENTION

Embodiments of the present invention provide a method and apparatus for providing node information, so as to increase efficiency of a device management (DM) server acquiring node information.

An embodiment of the present invention provides a method for providing node information. A command for requesting node information associated with a target node is received. The command includes a management object identifier (MOI) and node object information associated with the target node. The node information associated with the target node is sent according to the MOI and the node object information in the command.

Another embodiment of the present invention provides a method for acquiring node information. A command requesting node information associated with a target node is received. The command includes a management object identifier (MOI) and node object information associated with the target node. The node information associated with the target node is received. The node information is returned according to the MOI and the node object information in the command.

Further another embodiment of the present invention provides a terminal device. A receiver is configured to receive a command requesting node information associated with a target node from a device management (DM) server. The command includes a management object identifier (MOI) and node object information associated with the target node. A transmitter is configured to send the node information associated with the target node according to the MOI and the node object information.

Still further another embodiment of the present invention provide a device management (DM) server. A transmitter is configured to send a command for requesting node information associated with a target node to a terminal device. The command includes a management object identifier (MOI) and node object information associated with the target node. A receiver is configured to receive from the terminal device the node information.

According to the embodiments, by receiving the command that includes the MOI and the node object information, node information is acquired and returned to the DM server, so that the DM server can acquire the node information by sending one command, thereby greatly increasing the efficiency of the DM server acquiring the node information.

DETAILED DESCRIPTION OF ILLUSTRATIVE EMBODIMENTS

Figure 1:
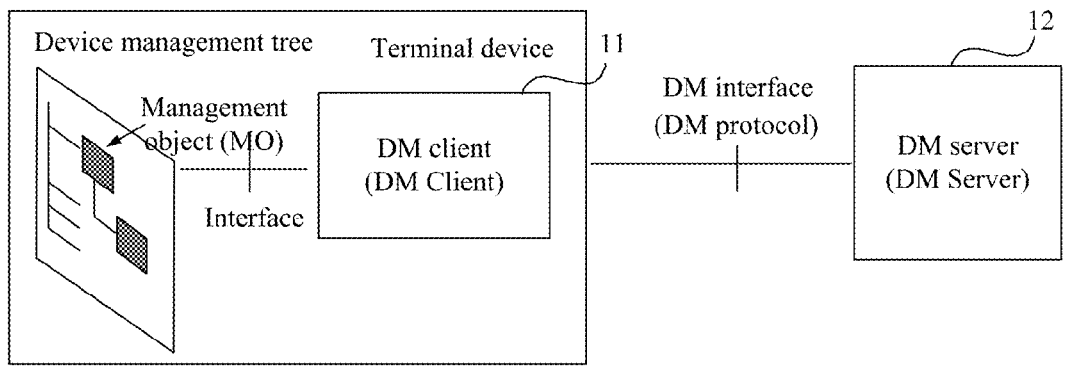
FIG. 1 is a schematic structural diagram of a device management (DM) system according to an embodiment of the present invention.

FIG. 1 is a schematic structural diagram of a device management (DM) system according to an embodiment of the present invention. The system includes a DM client 11 and a DM server 12. The DM server 12 sends a command to the DM client 11 to acquire management object (MO) instance information. The sent command may include an MO identifier (MOI) and node object information, so as to indicate that the DM server 12 intends to acquire information of a node corresponding to the node object information in an MO instance. The DM client 11 finds, after receiving the command, a position of the corresponding MO instance according to the MOI, find a corresponding node according to the node object information, acquire corresponding node information, and return the acquired node information to the DM server 12. The node object information may include any one or any combination of node ID information and a node information parameter. The node ID information may be a relative URI and a node name. The node information parameter may be any one of a level parameter (for example, "?list=StructDataLevel2"), a structure parameter (for example, "?list=Struct"), a structure data parameter (for example, "?list=StructData"), and a Tree aNd Description Serialization (TNDS) parameter (for example, "?list=TNDS").

In this embodiment, the DM server 12 sends the command including the MOI and the node object information to the DM client 11, so that the DM client 11 not only can determine the position of the MO instance, but also can find a target node according to the node object information, and acquire the node information of the target node and return the node information to the DM server 12. Therefore, the DM server 12 can acquire the node information by sending one command, thereby greatly increasing efficiency of the DM server 12 acquiring the node information, and increasing execution efficiency of the DM system.

Figure 2:
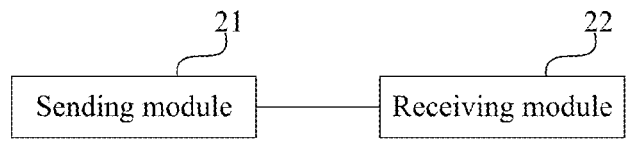
FIG. 2 is a schematic structural diagram of a DM server according to an embodiment of the present invention.

FIG. 2 is a schematic structural diagram of a DM server according to an embodiment of the present invention. The DM server may include a sending module 21 and a receiving module 22. The sending module 21 sends a command to a DM client to acquire node information. The receiving module 22 receives the node information returned by the DM client. The command may include a MOI and node object information, and the system according to the foregoing embodiment may serve as a reference.

When the node object information includes only node ID information, the receiving module 22 may be specifically configured to receive information of a node corresponding to the node ID information in an MO instance. The MO instance corresponds to the MOI.

When the node object information includes only a node information parameter:

if the node information parameter is a level parameter, the receiving module 22 may be specifically configured to receive node information of a descendant node corresponding to the level parameter in an MO instance, where the MO instance corresponds to the MOI; or if the node information parameter is a structure parameter, the receiving module 22 may be specifically configured to receive structure information of an MO instance corresponding to the MOI, where the structure information is returned according to the structure parameter; or if the node information parameter is a structure data parameter, the receiving module 22 may be specifically configured to receive the structure information of the MO instance corresponding to the MOI and data information of a leaf node that are returned according to the structure data parameter; or if the node information parameter is a TNDS parameter, the receiving module 22 is specifically configured to receive information about a serialized management sub-tree of the MO instance corresponding to the MOI, where the information is returned according to the TNDS parameter.

When the node object information includes not only the node ID information but also the node information parameter, the receiving module 22 may be specifically configured to receive node information of a descendant node that corresponds to the level parameter and is under a node corresponding to the node ID information in the MO instance; or the receiving module 22 may be specifically configured to receive structure information of a management sub-tree of a node corresponding to the node ID information in the MO instance; or the receiving module 22 may be specifically configured to receive structure information of a management sub-tree of a node corresponding to the node ID information and data information of a leaf node in the MO instance; or the receiving module 22 may be specifically configured to receive information about a serialized management sub-tree of a node corresponding to the node ID information in the MO instance.

In this embodiment, the DM server sends the command including the MOI and the node object information to the DM client through the sending module 21, so that the DM client not only can determine the position of the MO instance, but also can find the target node according to the node object information, and acquire the node information of the target node and return the node information to the DM server. In this way, the DM server can acquire the node information by sending one command, thereby greatly increasing efficiency of the DM server acquiring the node information.

Figure 3:
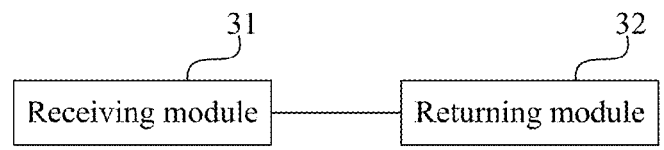
FIG. 3 is a schematic structural diagram of a terminal device according to an embodiment of the present invention.

FIG. 3 is a schematic structural diagram of a terminal device according to an embodiment of the present invention. The terminal device includes a receiving module 31 and a returning module 32. The receiving module 31 receives a command that is sent by a DM server and used to acquire MO instance information. The command may include an MOI and node object information, and the system according to the foregoing embodiment may serve as a reference. The returning module 32 acquires node information according to the MOI and the node object information in the command, and returns the node information to the DM server. Specifically, the returning module 32 may find a position of a corresponding MO instance according to the MOI in the command that is received by the receiving module 31, and further acquire the node information at the found position according to the node object information in the command.

When the node object information includes only node ID information, the returning module 32 may be specifically configured to return information of a node corresponding to the node ID information in an MO instance. The MO instance corresponds to the MOI.

When the node object information includes only a node information parameter:

if the node information parameter is a level parameter, the returning module 32 may be specifically configured to return node information of a descendant node corresponding to the level parameter in an MO instance, where the MO instance corresponds to the MOI; or if the node information parameter is a structure parameter, the returning module 32 may be specifically configured to return, according to the structure parameter, structure information of the MO instance corresponding to the MOI; or if the node information parameter is a structure data parameter, the returning module 32 may be specifically configured to return structure information of the MO instance corresponding to the MOI and data information of a leaf node according to the structure data parameter; or if the node information parameter is a TNDS parameter, the returning module 32 may be specifically configured to return, according to the TNDS parameter, information about a serialized management sub-tree of the MO instance corresponding to the MOI.

When the node object information includes not only the node ID information but also the node information parameter, the returning module 32 may be specifically configured to return node information of a descendant node that corresponds to the level parameter and is under a node corresponding to the node ID information in the MO instance; or the returning module 32 may be specifically configured to return structure information of a management sub-tree of a node corresponding to the node ID information in the MO instance; or the receiving module 32 may be specifically configured to return structure information of a management sub-tree of a node corresponding to the node ID information and data information of a leaf node in the MO instance; or the returning module 32 may be specifically configured to return information about a serialized management sub-tree of a node corresponding to the node ID information in the MO instance.

The returning module 32 may further be configured to return, in the case that a node corresponding to the node object information does not exist, information indicating that the node does not exist.

The receiving module 31 and the returning module 32 may be set in a DM client of the terminal device.

In the terminal device according to the this embodiment, the returning module 32 of the terminal device finds the node information that is specified by the command received by the receiving module 31, and returns the node information to the DM server, so that the terminal device can acquire the node information of the target node when receiving one command sent by the DM server, and the DM server can acquire the node information by sending one command, thereby greatly increasing efficiency of the DM server acquiring the node information.

Figure 4:
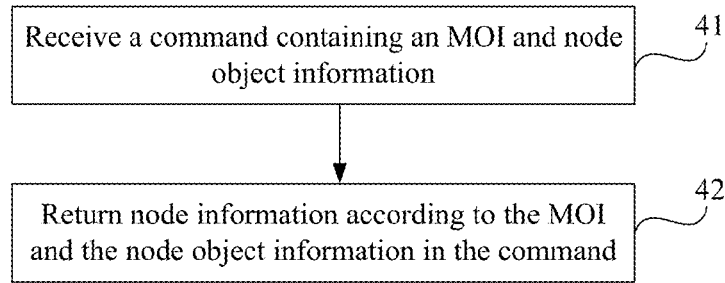
FIG. 4 is a flow chart of a method for providing node information according to an embodiment of the present invention.

FIG. 4 is a flow chart of a method for providing node information according to an embodiment of the present invention. The method may include the following steps.

Step 41: A DM client receives a command that is sent by a DM server and includes an MOI and node object information.

Step 42: The DM client returns node information to the DM server according to the MOI and the node object information in the command.

For details about the node object information in step 41 and step 42, refer to the system according to the foregoing embodiment.

In this embodiment, the DM server sends the command including the MOI and the node object information to the DM client, and the DM client acquires the node information according to the MOI and the node object information and returns the node information, so that the DM server can acquire the node information by sending only one command, thereby greatly increasing efficiency of the DM server acquiring the node information.

A method for acquiring node information according to an embodiment of the present invention may include:

sending a command including an MOI and node object information to a terminal device, where the command may include the MOI and the node object information, and the system according to the foregoing embodiment may serve as a reference; and receiving node information that is returned, according to the MOI and the node object information in the command, by the terminal device.

When the node object information includes node ID information, the receiving the node information, where the node information is returned according to the MOI and the node object information in the command may include: receiving information of a node corresponding to the node ID information in an MO instance, where the MO instance corresponds to the MOI; or when the node object information includes only a node information parameter, if the node information parameter is a level parameter, the receiving the node information, where the node information is returned according to the MOI and the node object information in the command may include: receiving returned node information of a descendant node corresponding to the level parameter in the MO instance, where the MO instance corresponds to the MOI; or if the node information parameter is a structure parameter, the receiving the node information, where the node information is returned according to the MOI and the node object information in the command may include: receiving structure information of the MO instance corresponding to the MOI, where the structure information is returned according to the structure parameter; or if the node information parameter is a structure data parameter, the receiving the node information, where the node information is returned according to the MOI and the node object information in the command may include: receiving structure information of the MO instance corresponding to the MOI and data information of a leaf node that are returned according to the structure data parameter; or if the node information parameter is a TNDS parameter, the receiving the node information, where the node information is returned according to the MOI and the node object information in the command may include: receiving information about a serialized management sub-tree of the MO instance corresponding to the MOI, where the information is returned according to the TNDS parameter.

When the node object information includes a node information parameter and node ID information, the receiving the returned node information of the descendant node corresponding to the level parameter in the MO instance may include: receiving node information of a descendant node that corresponds to the level parameter and is under a node corresponding to the node ID information in the MO instance; or the receiving the structure information of the MO instance corresponding to the MOI, where the structure information is returned according to the structure parameter may include: receiving structure information of a management sub-tree of a node corresponding to the node ID information in the MO instance; or the receiving the structure information of the MO instance corresponding to the MOI and the data information of the leaf node that are returned according to the structure data parameter may include: receiving structure information of a management sub-tree of a node corresponding to the node ID information and data information of a leaf node in the MO instance; or the receiving the information about the serialized management sub-tree of the MO instance corresponding to the MOI, where the information is returned according to the TNDS parameter may include: receiving information about a serialized management sub-tree of a node corresponding to the node ID information in the MO instance.

In this embodiment, a DM server acquires the node information by sending only one command to the terminal device, thereby greatly increasing execution efficiency.

Figure 5A:
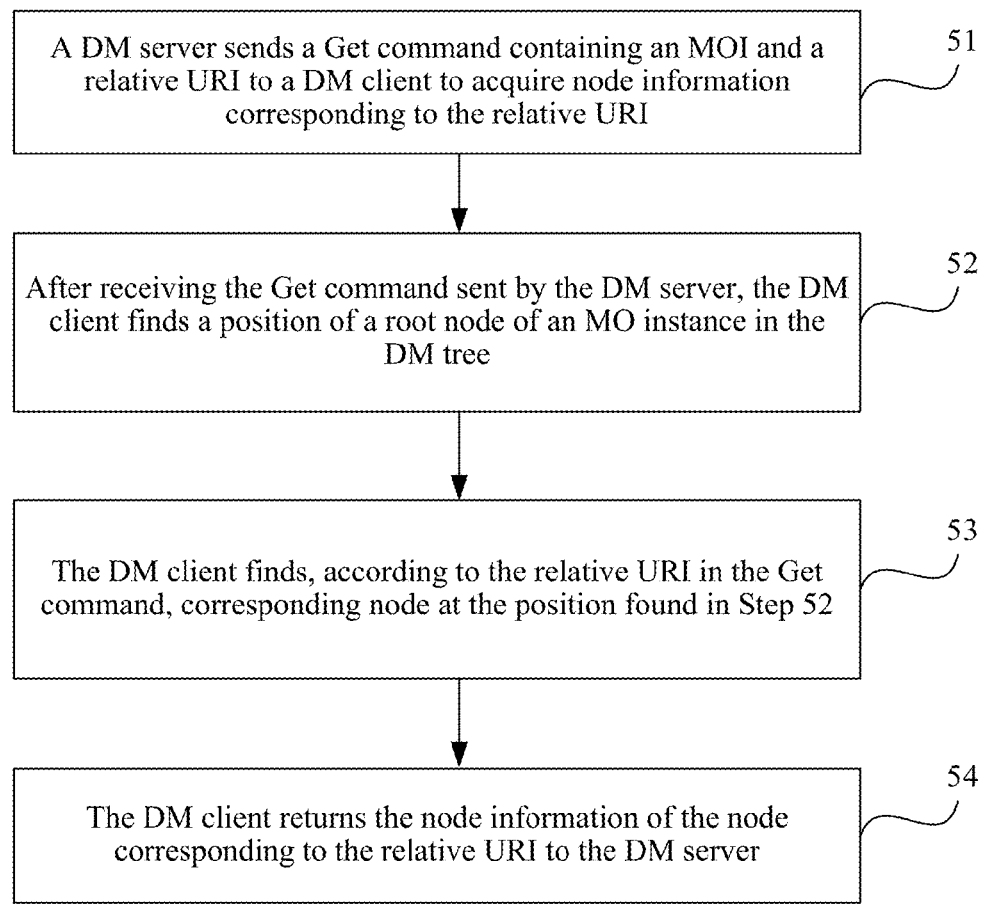
FIG. 5A is a flow chart of a method for providing node information according to another embodiment of the present invention.
Figure 5B:
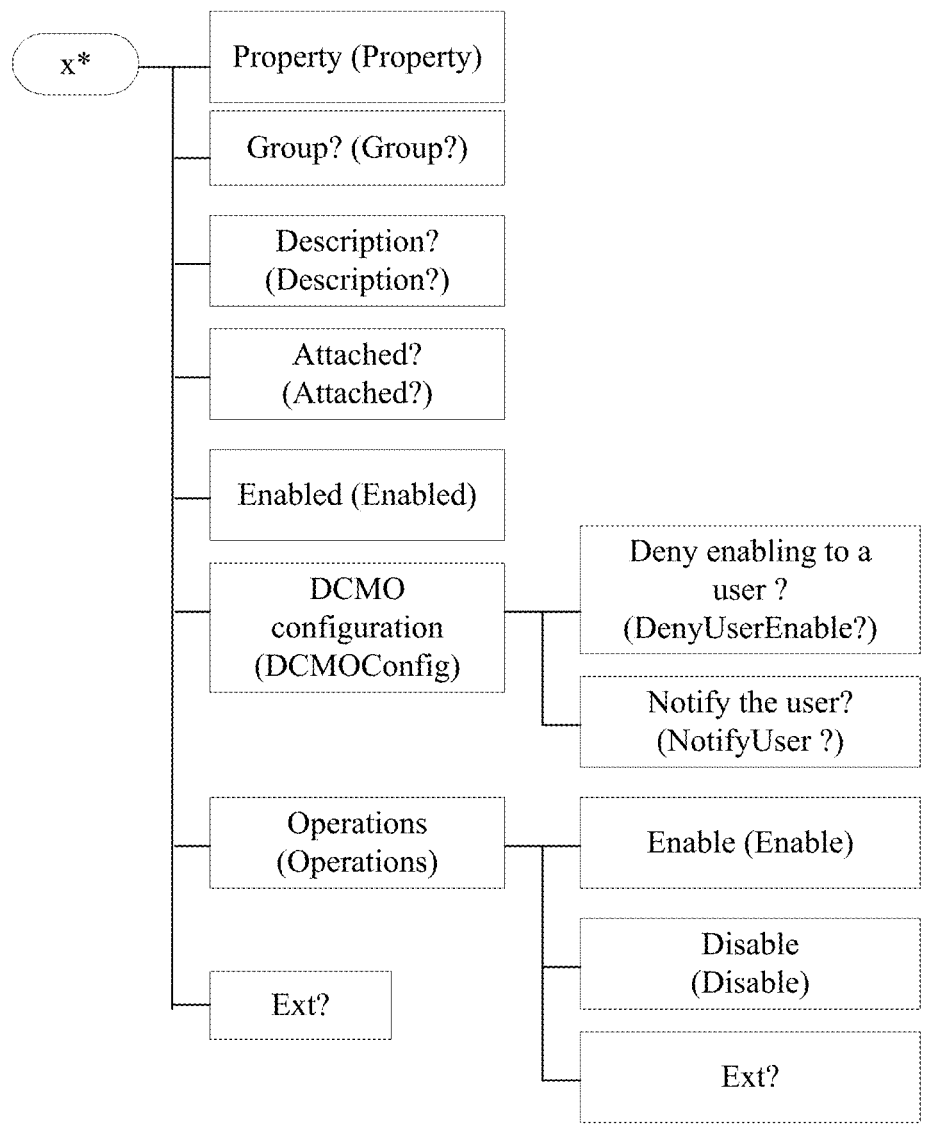
FIG. 5B is a data model diagram of a device capability management object (DCMO) corresponding to FIG. 5A.
Figure 5C:
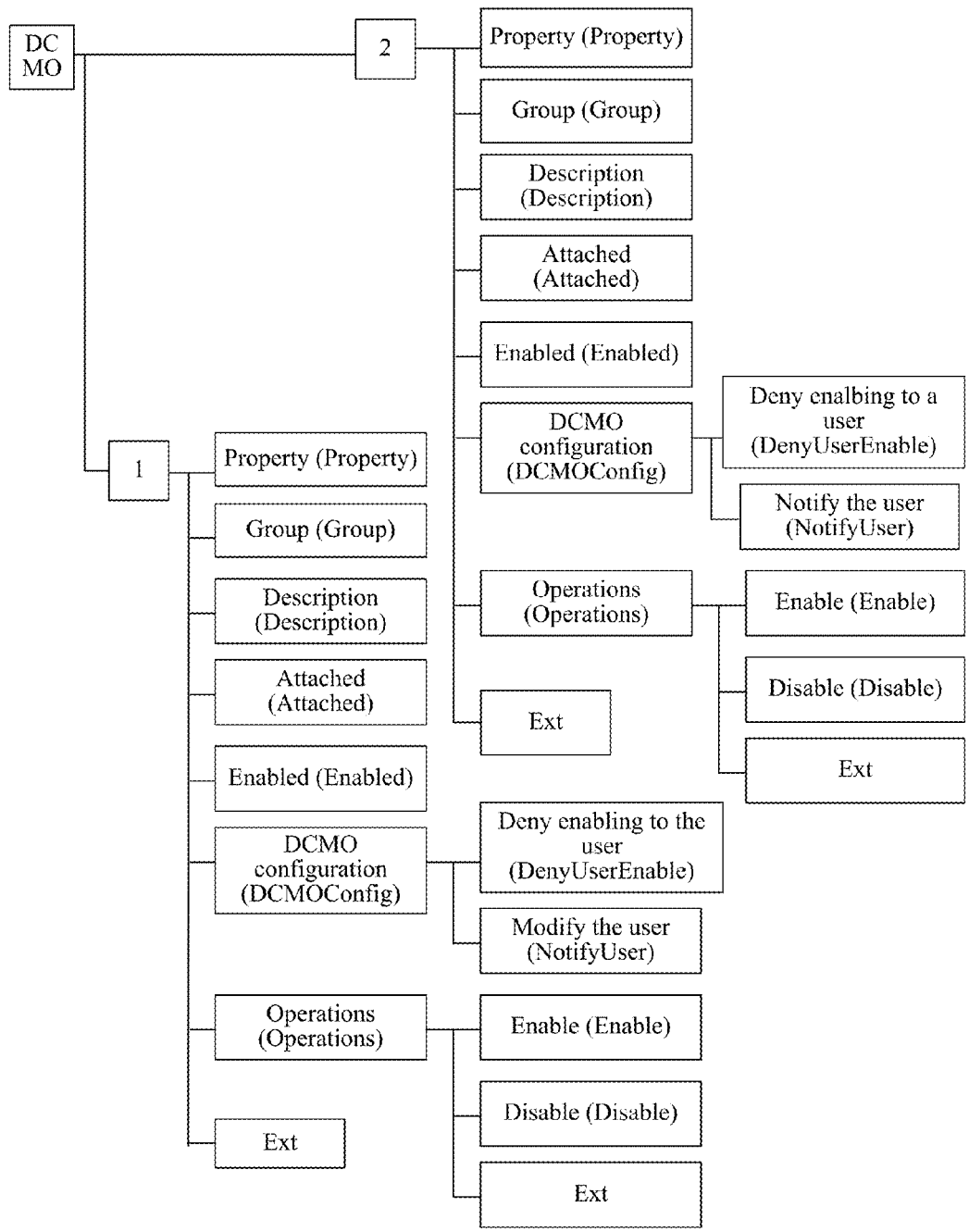
FIG. 5C is a schematic diagram of an MO instance corresponding to FIG. 5A.

FIG. 5A is a flow chart of another method for providing node information according to an embodiment of the present invention. FIG. 5B is a data model diagram of a DCMO corresponding to FIG. 5A. FIG. 5C is a schematic diagram of an MO instance corresponding to FIG. 5A. In this embodiment, it is assumed that a DCMO instance is stored under a DCMO node in a DM tree, and the DCMO node is a child node of ".". An x node in FIG. 5B is instantiated to obtain DCMO instances shown in FIG. 5C, which are named "1" and "2" respectively. A node 1 and all descendant nodes of the node 1 may be collectively referred to as a DCMO instance 1, and a node 2 and all descendant nodes of the node 2 may be collectively referred to as a DCMO instance 2. Nodes in the two instances have different values respectively, and the two instances perform different functions respectively. When a DM server needs to acquire node information of a node, for example, a "Property" node, the acquiring procedure includes the following steps.

Step 51: The DM server sends a "Get" command including an MOI and a relative URI to a DM client to acquire node information, for example, node information of the "Property" node in this embodiment, corresponding to the relative URI.

Step 52: After receiving the "Get" command sent by the DM server, the DM client finds a position of an MO instance, that is, a position of the node 1 and the node 2, in the DM tree.

Step 53: The DM client finds, according to the relative URI in the "Get" command, a corresponding node, for example, the "Property" node in this embodiment, at the position found in step 52, and acquire the node information of the "Property" node.

Step 54: The DM client returns the node information of the node, for example, the node information of the "Property" node in this embodiment, corresponding to the relative URI in the MO instance that is found in step 52 to the DM server.

Therefore, the DM server acquires relevant information about the MO instance by sending one command. The information includes not only the position of the instance but also node information of a node in the MO instance.

The Get command in step 51 may be:

```
"<Get>
  <CmdID>4</CmdID>
  <Item>
    <Target><LocURI>urn:oma:mo:oma-dcmo:1.0/Property</LocURI>
    </Target>
  </Item>
</Get>".
```

The "Get" command uses "Item/Target/LocURI" to carry the MOI of the DCMO and the relative URI of the "Property" node, indicating that the DM server intends to acquire a value of the Property node in the DCMO instance. The MOI is "urn:oma:mo:oma-dcmo:1.0".

"?prop=<property_name>" may also be added behind the relative URI to acquire node information such as a node property. In this embodiment, the relative URI is appended behind the MOI for representation, that is, "urn:oma:mo:oma-dcmo:1.0/Property". This embodiment does not limit a specific presentation manner of the MOI and the relative URI, provided that the two pieces of information are included and can be parsed by the DM client. For example, a reserved symbol may be used to clearly mark the MOI, and then the relative URI is appended. For example, question marks are used for marking, that is, "?urn:oma:mo:oma-dcmo:1.0?". Furthermore, the MOI and the relative URI may also be separated, for example:

```
"<Get>
  <CmdID>4</CmdID>
  <Item>
    <TargetParent>
      <LocName>urn:oma:mo:oma-dcmo:1.0</LocName>
    </TargetParent>
    <Target><LocURI>Property</LocURI></Target>
  </Item>
</Get>".
```

In the command, the "Item" includes the "TargetParent", and in the "TargetParent", the "LocName" is used to carry the MOI. The relative URI is still carried in the "Item/Target/LocURI", and the relative URI herein is the "Property".

In Step 52, after receiving the command, the DM client can know that the DM server needs to acquire the relevant information about the MO instance with the MOI being "urn:oma:mo:oma-dcmo:1.0", and the DM client first finds a position of the DCMO in the DM tree. A method for searching may be traversing all interior nodes of the DM tree for a node with the node type being "urn:oma:mo:oma-dcmo:1.0", and a position of a root node of the MO instance may also be determined according to saved corresponding relationship information of the MOI and a node position. In this embodiment, the root node of the MO instance is the node 1 and the node 2 after the x node is instantiated. Through the method for searching, the DM client finds that positions of DCMO instances in the DM tree are "./DCMO/1" and "./DCMO/2", that is, the node 1 and the node 2 in FIG. 5C.

In step 53, the DM client acquires the node information according to the relative URI in the command, that is, the "Property" nodes under the node 1 and the node 2 are found, and node values are acquired.

In step 54, the DM client may return the node information to the DM server through the following Results command:

```
"<Results>
   <CmdRef>4</CmdRef>
      <CmdID>7</CmdID>
   <Item>
      <Meta><Format xmlns="syncml:metinf">chr</Format></Meta>
      <Source><LocURI>./DCM0/1/Property</LocURI></Source>
         <Data>Camera</Data>
   </Item>
   <Item>
      <Meta><Format xmlns="syncml:metinf">chr</Format></Meta>
      <Source><LocURI>./DCMO/2/Property</LocURI></Source>
         <Data>Speaker</Data>
   </Item>
</Results>"
```

In the Results command, multiple "Items" are used to carry information about different nodes. The "Item/Source/LocURI" element element carries an absolute URI of the Property node, that is, "./DCMO/1/Property" or "./DCMO/2/Property", and the "Item/Data" element element carries a value of the Property node. The value of the "./DCMO/1/Property" node is "Camera", and the value of the "./DCMO/1/Property" node is "Speaker".

It should be noted that, the absolute URI in fact includes the positions of the DCMO instances, that is, "./DCMO/1" and "./DCMO/2". The returned information may not use the absolute URI, and instead use a relative URI, for example, "1/Property" and "2/Property".

In this embodiment, the DM server acquires the node values of the specified nodes of multiple MO instances from the DM client through one command, thereby further increasing efficiency of the DM server acquiring the node information and meanwhile saving OTA resources.

Figure 6A:
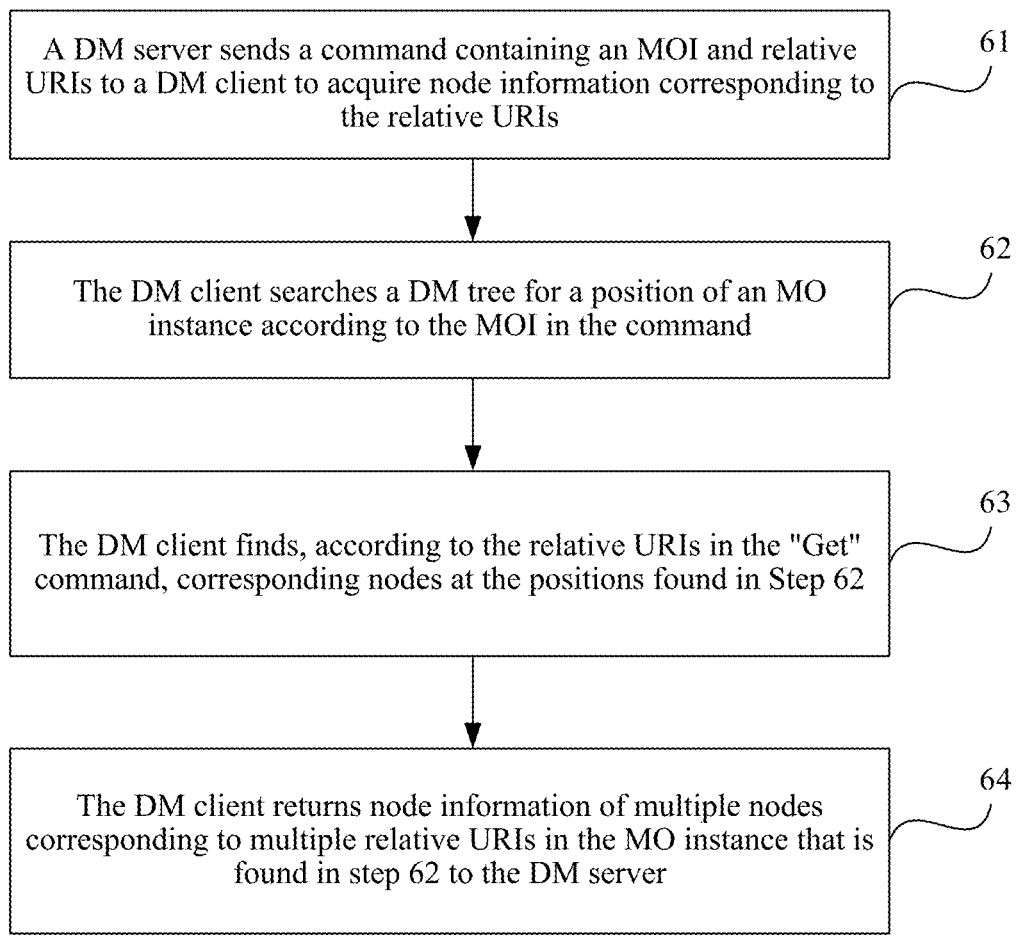
FIG. 6A is a flow chart of a method for providing node information according to another embodiment of the present invention.
Figure 6B:
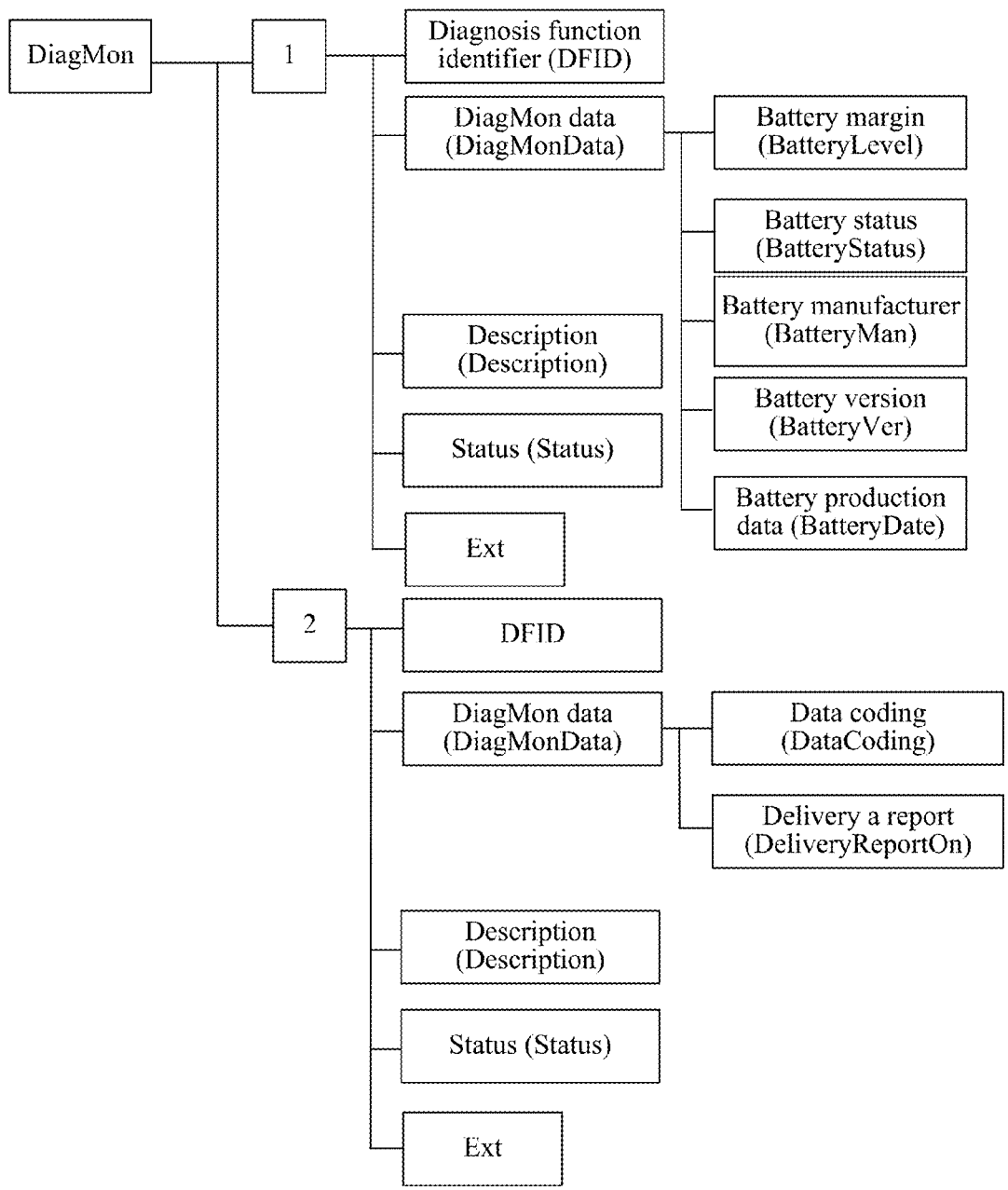
FIG. 6B is a schematic diagram of a Diagnostics and Monitoring (DiagMon) MO instance corresponding to FIG. 6A.

FIG. 6A is a flow chart of another method for providing node information according to an embodiment of the present invention. FIG. 6B is a schematic diagram of a DiagMon MO instance corresponding to FIG. 6A. It is assumed that in a DM tree, a DiagMon MO instance shown in FIG. 6B exists, a "DiagMon" node shown in FIG. 6B is a child node of a root node of the DM tree, two MO instances exist under the "DiagMon" node, and root nodes of the instances are a node 1 and a node 2 respectively. The node 1 and all descendant nodes of the node 1 may be collectively referred to as a DiagMon MO instance 1, and the node 2 and all descendant nodes of the node 2 may be collectively referred to as a DiagMon MO instance 2. If a DM server uses one command to acquire node information of multiple nodes in an MO instance, the following steps may be included.

Step 61: The DM server sends a "Get" command including an MOI and relative URIs to a DM client to acquire node information, for example, node information of a "DFID" node and a "Status" node in this embodiment, corresponding to the relative URIs.

Step 62: After receiving the "Get" command sent by the DM server, the DM client searches the DM tree for a position of the MO instance, that is, a position of the node 1 and the node 2, according to the MOI in the "Get" command.

Step 63: The DM client finds, according to the relative URIs in the Get command, corresponding nodes, for example, the "DFID" node and the "Status" node in this embodiment, at the positions found in step 62, and acquire the node information of the "DFID" node and the "Status" node.

Step 64: The DM client returns the node information of the multiple nodes, that is, the node information of the "DFID" node and the "Status" node in this embodiment, corresponding to the multiple relative URIs in the MO instance that is found in step 62 to the DM server. In this way, the node information on the DM client is acquired.

The command sent by the DM server in step 61 may be:

```
"<Get>
   <CmdID>4</CmdID>
   <Item>
      <Target><LocURI>urn:oma:mo:oma-diagmon: 1.0/DFID</LocURI>
      </Target>
   </Item>
   <Item>
      <Target><LocURI>urn:oma:mo:oma-diagmon: 1.0/Status</LocURI></Target>
   </Item>
</Get>".
```

In this command, two "Items" are used to indicate that the DM server needs to acquire node values of the "DFID" node and the "Status" node in the MO instance with the MOI being "urn:oma:mo:oma-diagmon:1.0". Compared with the "Get" command in step 51, this command is added with "Items", and the information is carried in each of the Items by using the same method as that used in the foregoing embodiment. "?prop=<property_name>" may also be added behind a relative URI to acquire a node property.

Processing of step 62 and step 63 may be the same as that of step 52 and step 53, but herein, values of two nodes in each MO instance need to be acquired.

In step 64, after acquiring the node values, the DM client can still return the node information to the DM server by sending a "Results" command. The "Results" command may be:

```
"<Results>
   <CmdRef>4</CmdRef>
      <CmdID>7</CmdID>
   <Item>
      <Meta><Format xmlns="syncml:metinf">chr</Format></Meta>
      <Source><LocURI>./DiagMon/1/DFID</LocURI></Source>
         <Data>urn:oma:mo:oma-diag:device:BatteryInfo:1.0</Data>
   </Item>
   <Item>
      <Meta><Format xmlns="syncml:metinf">chr</Format></Meta>
      <Source><LocURI>./DiagMon/1/Status</LocURI></Source>
         <Data>Running</Data>
   </Item>
   <Item>
      <Meta><Format xmlns="syncml:metinf">chr</Format></Meta>
      <Source><LocURI>./DiagMon/2/DFID</LocURI></Source>
         <Data>urn:oma:diag:device:SmsOptions:1.0</Data>
   </Item>
   <Item>
      <Meta><Format xmlns="syncml:metinf">chr</Format></Meta>
      <Source><LocURI>./DiagMon/2/Status</LocURI></Source>
         <Data>Stopped</Data>
   </Item>
</Results>".
```

The command includes absolute URIs and the node values of the "DFID" node and the "Status" node of the two DiagMon MO instances. The information are carried in the same manner as that in step 54, but in this embodiment each MO instance includes information about two nodes, which is equivalent to that totally four pieces of information are included, and the four pieces of information are all carried by the "Item" elements.

It should be noted that, the four pieces of information are arranged in an order of the MO instances. For example, information about the two nodes of the DiagMon MO instance 1 is followed by information about the two nodes of the DiagMon MO instance 2. The four pieces of information may also be arranged in another order. For example, the information about the two "DFID" nodes is followed by the information about the two "Status" nodes. The DM server may know from the absolute URIs that two MO instances exist, and know the relevant node values.

When the DM server intends to acquire information of a node of an MO instance, an MO instance or some MO instances do not have the node, for example, an optional node is not defined in an instance, for example, different DiagMon Function MOs may define different node sets, and therefore the instances of the DiagMon Function MOs may include different nodes; or although a node is defined, but the node is not created in the DM tree. In this case, the DM client cannot provide the DM server with the node information of the node. In this case, the DM client can still use a "Results" command to return node information of a node that exists, and notifies the DM server that information of a node or some nodes cannot be acquired through a status return command (a "Status" command) corresponding to the "Get" command. Specifically, in the "Status" command, a "Data" element may be used to carry a status code to specify information indicating that a node does not exist, and an "Item" element may also be used in the "Status" command to specifically indicate a URI of the node that does not exist.

In this embodiment, the DM server acquires the node values of the multiple nodes of the multiple MO instances from the DM client through one command, thereby further increasing efficiency of the DM server acquiring the node information, and saving OTA resources.

Figure 7A:
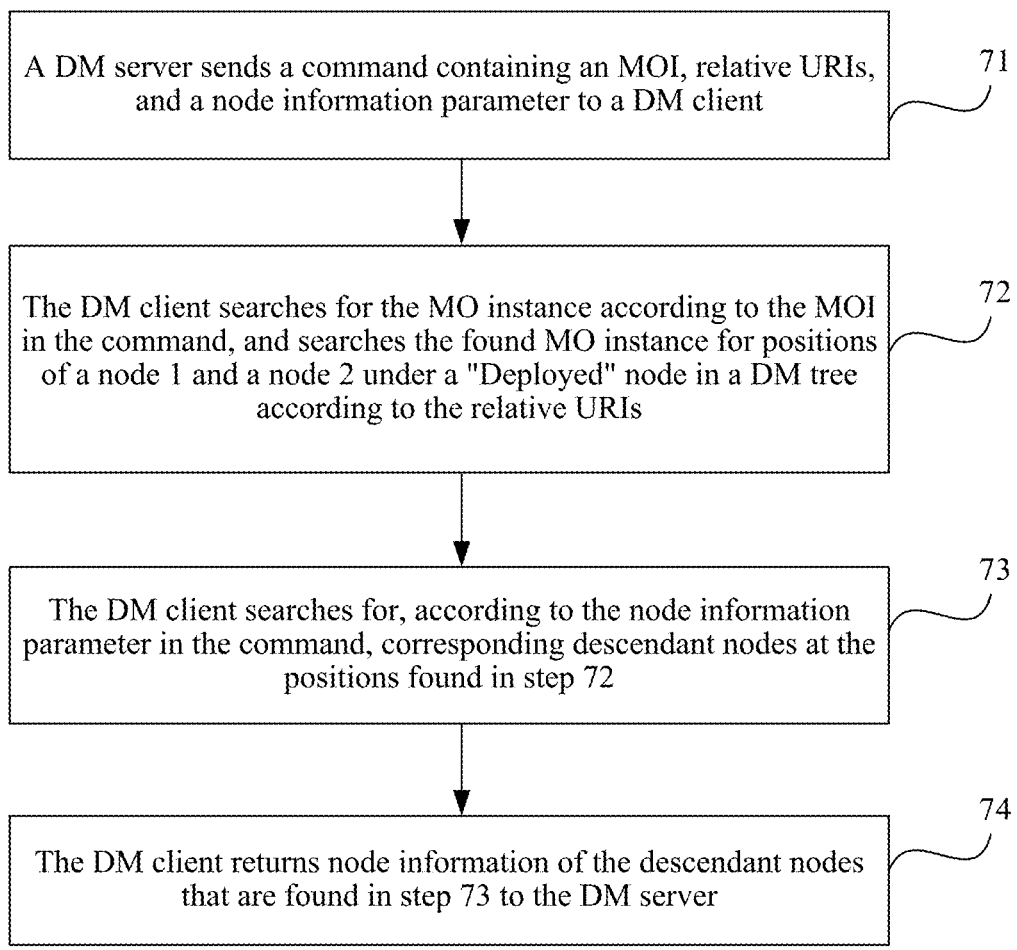
FIG. 7A is a flow chart of a method for providing node information according to a further another embodiment of the present invention.
Figure 7B:
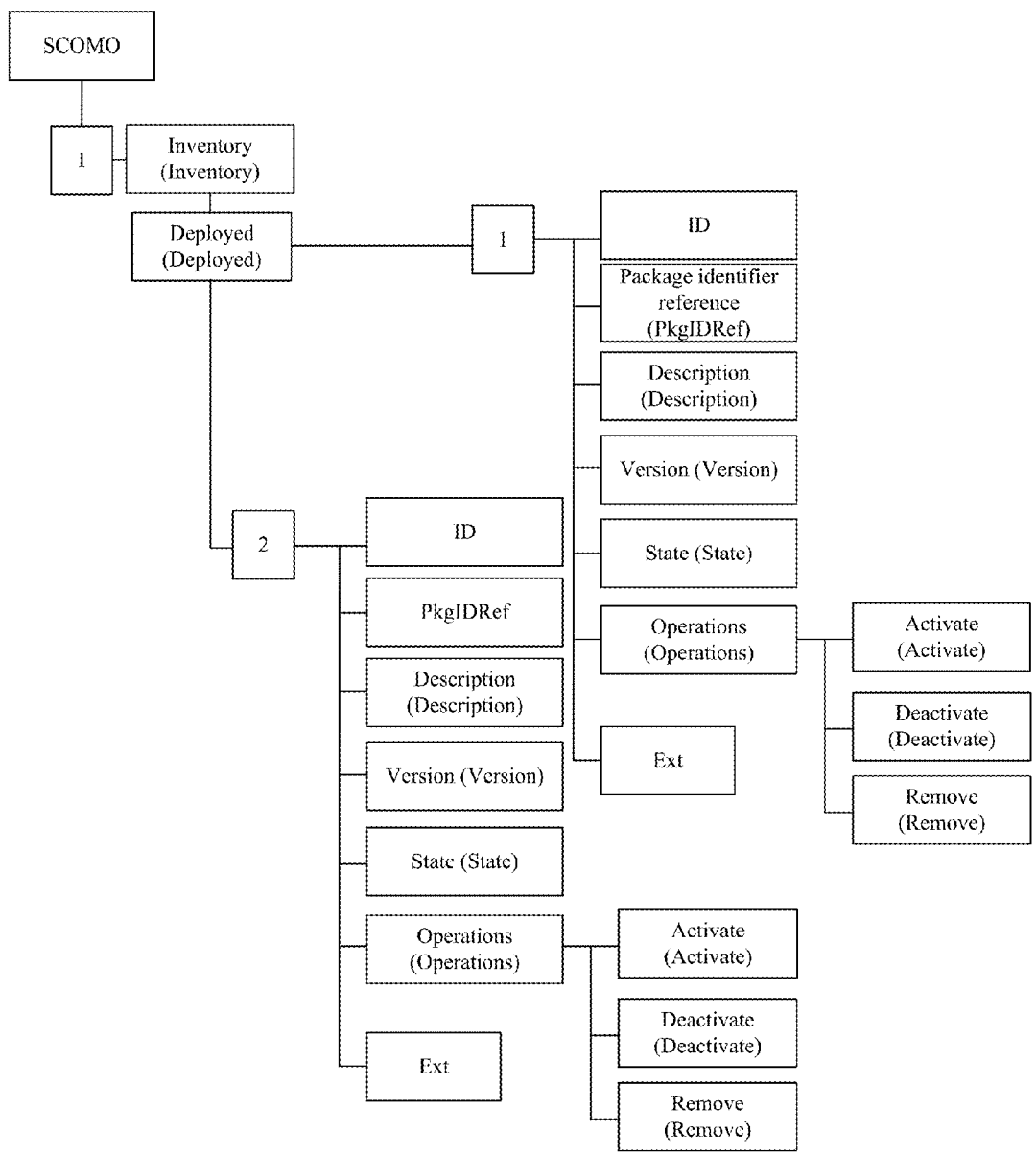
FIG. 7B is a schematic diagram of a Software Component MO (SCOMO) instance corresponding to FIG. 7A.

FIG. 7A is a flow chart of another method for providing node information according to an embodiment of the present invention. FIG. 7B is a schematic diagram of an SCOMO instance corresponding to FIG. 7A. It is assumed that an SCOMO node shown in FIG. 7B is a child node of a root node of a DM tree, and FIG. 7B includes an SCOMO instance, that is, an MO instance. Two instances exist under a Deployed sub-tree of the SCOMO instance, that is, an instance 1 and an instance 2. The instance 1 and the instance 2 are not MO instances, but are management sub-tree instances. In this case, a server does not know which nodes are included in first level child nodes of the instance 1 and the instance 2. The first level child nodes refer to child nodes of a node 1 and a node 2 under a "Deployed" node. When the DM server needs to acquire node information of the node 1, the node 2, and the child nodes of the node 1 and the node 2 from the DM client, the following steps may be included.

Step 71: The DM server sends a Get command including an MOI, relative URIs, and a node information parameter to the DM client, and acquires node information, that is, the node information of the node 1, the node 2, and the child nodes of the node 1 and the node 2 in this embodiment, corresponding to the node information parameter.

Step 72: After receiving the Get command sent by the DM server, the DM client searches for the MO instance according to the MOI in the Get command, and finds positions of the node 1 and the node 2 under the "Deployed" node in the DM tree in the found MO instance according to the relative URIs.

Step 73: The DM client searches the positions found in step 72 for corresponding descendant nodes, that is, the node 1, the node 2, and an "ID" node, a "PkgIDRef" node, a "Name" node, a "Description" node, a "Version" node, an "Operations" node, a "State" node, and an "Ext" node under the node 1 and the node 2 in this embodiment, according to the parameter in the "Get" command, and acquire node information of these nodes.

Step 74: The DM client returns the node information of the descendant nodes, that is, the node information of the "ID" node, the "PkgIDRef" node, the "Name" node, the "Description" node, the "Version" node, the "State" node, and the "Ext" node in this embodiment, found in step 73 to the DM server. In this way, the node information on the DM client is acquired.

The command sent by the DM server in step 71 may be:
"<Get>
  <CmdID>4</CmdID>
  <Item>
    <Target>
      <LocURI>urn:oma:mo:oma-scomo:1.0/Inventory/
        Deployed?list=StructDataLevel2</LocURI>
    </Target>
</Get>".

Information carried by the DM server in an "Item/Target/LocURI" element of the command is "urn:oma:mo:oma-scomo:1.0/Inventory/Deployed?list=StructDataLevel2"; besides the MOI information and the relative URI information included in step 51 and step 61, a level parameter "?list=StructDataLevel2" is further included. The "StructDataLevel2" in the level parameter is used to indicate that the DM server intends to acquire information about node structures and/or node values of two levels under the "Deployed" node, that is, the node structures and/or node values of the node 1, the first level child nodes of the node 1, the node 2, and the first level child nodes of the node 2. Only the leaf nodes have values. If the DM server needs to use the command to acquire the information about the first level child nodes of the MO instances shown in FIG. 5C and FIG. 6B, the relative URI information may not be included, and in this case, the command includes only the MOI information and the preceding node information parameter, that is, the "Item/Target/LocURI" element carries "urn:oma:mo:oma-scomo:1.0?list=StructDataLevel1". Step 51 and the description of step 51 may serve as a reference for a presentation manner of the MOI information and the node object information.

In step 74, after receiving the command sent by the DM server and acquiring the information about the relevant nodes, the DM client may respond to the DM server through the following command:

"<Results>
  <CmdRef>4</CmdRef>
    <CmdID>7</CmdID>
  <Item>
      <Meta><Format xmlns="syncml:metinf">node</Format></Meta>
      <Source><LocURI>ISCOMO/1/Inventory/Deployed </LocURI></Source>
  </Item>
  <Item>

```
    <Meta><Format xmlns="syncml:metinf">node</Format></Meta>
    <Source><LocURI>ISCOMO/1/Inventory/Deployed/1 </LocURI></Source>
  </Item>
  <Item>
    <Meta><Format xmlns="syncml:metinf">chr</Format></Meta>
    <Source><LocURI>ISCOMO/1/Inventory/Deployed/VID</LocURI></Source>
        <Data>word</Data>
  </Item>
  <Item>
    <Meta><Format xmlns="syncml:metinf">chr</Format></Meta>
<Source><LocURI>ISCOMO/1/Inventory/Deployed/l/PkgIDRek/LocURI></Source>
        <Data>Pkg 1</Data>
  </Item>
    ......
  <Item>
    <Meta><Format xmlns="syncml:metinf">node</Format></Meta>
    <Source><LocURI>ISCOM0/1/Inventory/Deployed/2 </LocURI></Source>
  </Item>
  <Item>
    <Meta><Format xmlns="syncml:metinf">chr</Format></Meta>
    <Source><LocURI>ISCOM0/1/Inventory/Deployed/2/ID</LocURI></Source>
        <Data>Excel</Data>
  </Item>
  <Item>
    <Meta><Format xmlns="syncml:metinf">chr</Format></Meta>
<Source><LocURI>ISCOM0/1/Inventory/Deployed/2/PkgIDRek/LocURI></Source>
        <Data>Pkg2</Data>
  </Item>
  ......
</Results>".
```

It can be seen from the command that, the DM client returns the information about the "Deployed" node, the information about the node 1 and the first level child nodes of the node 1 in the instance 1, and the information about the node 2 and the first level child nodes of the node 2 in the instance 2. For a neat description, only the returning in respect of the node 1, the node 2, the "ID" child node, and the "PkgIDRef" child node is listed, and the returning in respect of other nodes is not described. The node information is carried in the "Results" command in the same manner as that in step 54 and step 64, but for the interior nodes, only absolute URIs of the interior nodes are returned, and for the leaf nodes, both absolute URIs and node values are returned. Similarly, according to step 64 and the description of step 64, in this embodiment, the arranging order of the node information in the command is not limited.

In this embodiment, the DM server notifies the DM client through the level parameter "?list=StructDataLevel2", and acquires the information about the node structures and/or the node values of the two levels under the "Deployed" node. "Level2" indicates that the DM server needs to acquire the information about the nodes of two levels under the specified URIs, which may also be "Level3" or "Level4" to acquire the information about nodes of a lower level. The returning manner of the terminal is also similar to that in the aforementioned example, and is not repeated herein. Similarly, the method according to this embodiment may still be applied to an MO instance.

The "Level2" in the command for acquiring the node information may also be removed, and a structure data parameter, that is, "?list=StructData", may be used directly, for example, "urn:oma:mo:oma-scomo:1.0/Inventory/Deployed?list=StructData", and in this way, structures and/or node information of all instances (including all descendant nodes) of the "Deployed" node needs to be acquired. The command for acquiring the node information may also use a structure parameter "?list=Struct" and a TNDS parameter "?list=TNDS"; for usage of the two parameters, refer to the protocol "DM1.2". A "Struct" property is used to acquire a structure of a management tree or a management sub-tree. A "TNDS" property is used to acquire information about a serialized management sub-tree. If these parameters are combined with the method according to the foregoing embodiment, structure information or information about a serialized management sub-tree under a position of a relative URI in an MO instance of a specified MOI can be acquired, and structure information or information about a serialized management sub-tree of an MO instance of a specified MOI can also be acquired.

In this embodiment, the DM server acquires not only the node values of the first level child nodes but also the node structures and/or data of two low levels from the DM client through one command, thereby further increasing efficiency of the DM server acquiring the node information, and saving OTA resources.

In the system, device, and method according to the foregoing embodiments, the DM server sends the command including the MOI and the node object information to the DM client, so that the DM client not only can determine the position of the MO instance, but also can find the target node according to the node object information, and acquire the node information of the target node. Therefore, the DM server can acquire the node information by sending one command, thereby greatly increasing the efficiency of the DM server acquiring the node information.

Another method may be used to acquire information about a specified node in an MO instance, that is, a server carries a name of a node required to be acquired in a command for acquiring information about an MO instance. The server may need to acquire information about a leaf node or information about an interior node.

Figure 8:
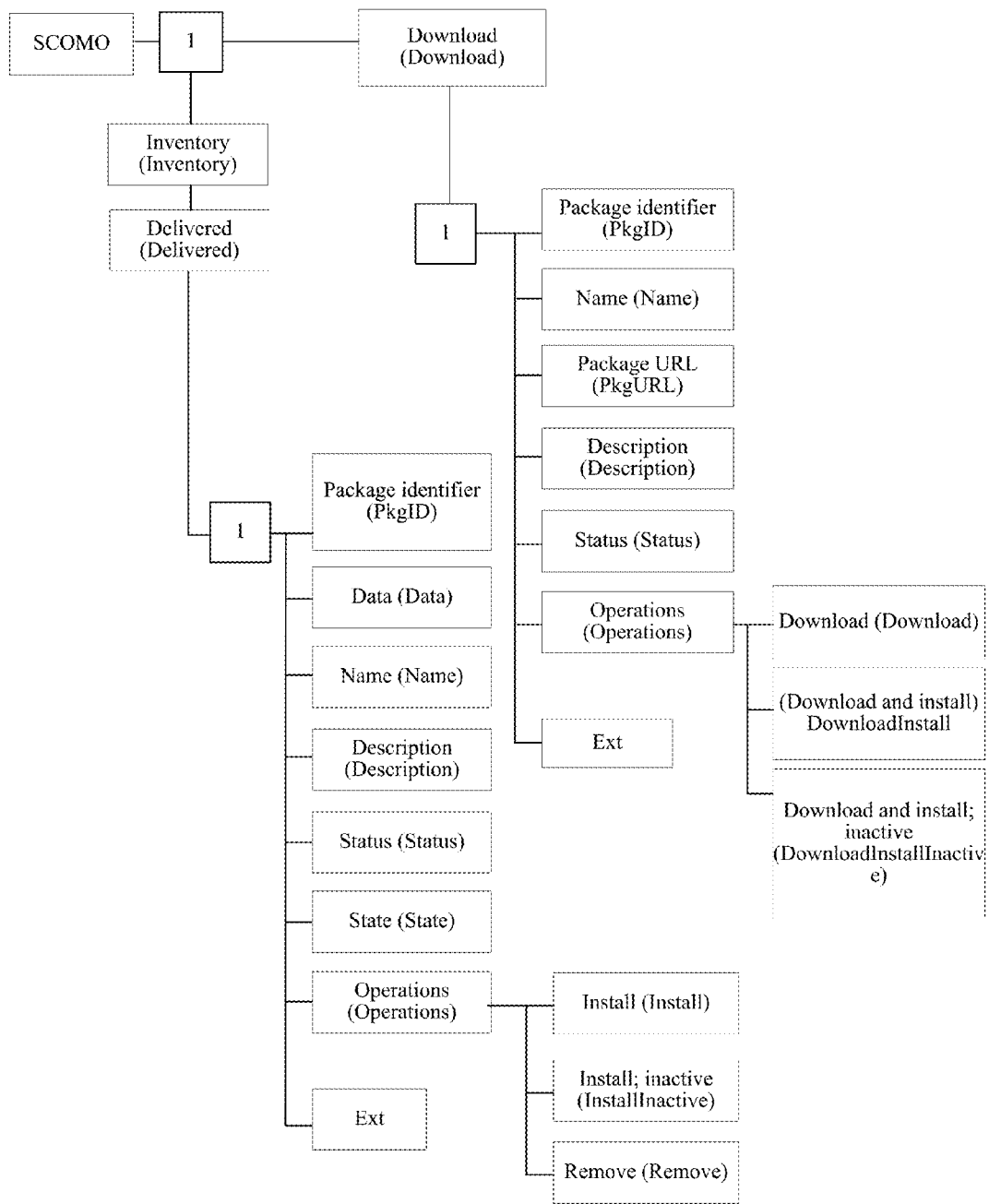
FIG. 8 is a schematic diagram of an SCOMO instance.

A situation that the server needs to acquire a leaf node is described first. It is assumed that the server needs to acquire information about a leaf node, that is, a PkgID node, in an SCOMO instance shown in FIG. 8, and the server sends the following command to a terminal device:

```
<Get>
    <CmdID>4</CmdID>
    <Item>
        <Target><LocURI>urn:oma:mo:oma-scomo:1.0 </LocURI></Target>
            <Data>"PkgID"</Data>
    </Item>
</Get>
```

In the preceding command, an Item/Target/LocURI element is used to carry an MOI of an SCOMO, that is, urn:oma:mo:oma-scomo:1.0, an Item/Data element is used to carry the name of the PkgID node, and the name is PkgID, which indicates that the server intends to acquire a value of the PkgID node in the SCOMO instance. Definitely, ?prop=<property_name> may also be added behind the node name to acquire a node property. The present invention does not limit the manner in which the MOI and the node name are carried in the command, provided that the two pieces of information are included and can be parsed by the terminal device. For example, a new element MOID may be used to carry the MOI, and the node name may also be appended behind the MOI, for example, urn:oma:mo:oma-scomo:1.0+PkgID. How the appending is implemented is not limited, for example, a "−" mark or a "/" mark may be used. In addition, the node name is not limited to be carried by the Data element, for example, an Item/Target/LocName element may be used for carrying.

After receiving the command, the terminal device can know that the server needs to acquire relevant information about an MO instance with the MOI being urn:oma:mo:oma-scomo:1.0, and the terminal first finds a position of the SCOMO in a DM tree. A method for searching may be traversing all interior nodes of the DM tree for a node with the node type being urn:oma:mo:oma-scomo:1.0, and definitely, a position of a root node of the MO instance may also be determined according to saved corresponding relationship information of the MOI and a node position.

Through the preceding procedure, the terminal finds that the position of the SCOMO instance in the DM tree found by the terminal finds is ./SCOMO/1. Then, the terminal acquires the node information according to the node name in the preceding command. In this case, a PkgID node under a node ./SCOMO/1 is searched for. One or multiple PkgID nodes may exist under the ./SCOMO/1. For example, a PkgID node exists under a ./SCOMO/1/Download/1 node and a ./SCOMO/1/Inventory/Delivered/1 node respectively. The terminal finds all PkgID nodes under the ./SCOMO/1, and return values of the PkgID nodes to the server.

```
<Results>
<CmdRef>4</CmdRef>
<CmdID>7</CmdID>
<Item>
<Meta><Format     xmlns="syncml:metinf">chr</Format></Meta>
<Source><LocURI>./SCOMO/1/Download/1/PkgID</LocURI></Source>
    <Data>Pkg1</Data>
</Item>
<Item>
<Meta><Format     xmlns="syncml:metinf">chr</Format></Meta>
<Source><LocURI>./SCOMO/1/Inventory/Delivered/1/PkgID
</LocURI></Source>
    <Data>Pkg1</Data>
</Item>
</Results>
```

The preceding codes describe the information returned by the terminal device to the server. The information uses a Results command. In the command, multiple Items are used to carry the information about different nodes. An Item/Source/LocURI element carries absolute URIs of the PkgID nodes, that is, ./SCOMO/1/Download/1/PkgID and ./SCOMO/1/Inventory/Delivered/1/PkgID, and an Item/Data element carries a value of a PkgID node, where the value of the ./SCOMO/1/Download/1/PkgID node is Pkg1, and the value of the ./SCOMO/1/Inventory/Delivered/1/PkgID is also Pkg1.

It should be noted that the absolute URIs in fact include the position of the SCOMO instance, that is, ./SCOMO/1. Definitely, the returned information may not use the absolute URIs, and instead use relative URIs, for example, 1/Inventory/Delivered/1/PkgID and 1/Download/1/PkgID.

Therefore, the server acquires the relevant information about the MO instance by sending one command. The information includes not only the position of the instance but also the value of the specified leaf node in the MO instance.

Then, a situation that the server needs to acquire information about an interior node is described. It is assumed that the server needs to acquire information about all child nodes of a Deployed node in the SCOMO instance shown in FIG. 7B, and the server sends the following command to the terminal device:

```
<Get>
    <CmdID>4</CmdID>
    <Item>
        <Target><LocURI>urn:oma:mo:oma-scomo:1.0 </LocURI></Target>
            <Data>"Deployed"</Data>
    </Item>
</Get>
```

In the preceding command, an Item/Target/LocURI element is used to carry an MOI of an SCOMO, that is, urn:oma:mo:oma-scomo:1.0, an Item/Data element is used to carry a name of the Deployed node, and the name is Deployed, which indicates that the server intends to acquire names of all child nodes of the Deployed node in the SCOMO instance. Definitely, ?prop=<property_name> may also be added behind the name of the Deployed node to acquire a node property. The present invention does not limit the manner in which the MOI and the node name are carried in the command, provided that the two pieces of information are included and can be parsed by the terminal device. For example, a new element MOID may be used to carry the MOI, and the node name may also be appended behind the MOI, for example, urn:oma:mo:oma-scomo:1.0+Deployed. How the appending is implemented is not limited, for example, a "−" mark or a "/" mark may be used. In addition, the node name is not limited to be carried by the Data element, for example, an Item/Target/LocName element may be used for carrying.

After receiving the command, the terminal device can know that the server needs to acquire relevant information about an MO instance with the MOI being urn:oma:mo:oma-scomo:1.0, and the terminal first finds a position of the SCOMO in a DM tree. A method for searching may be traversing all interior nodes of the DM tree for a node with the node type being urn:oma:mo:oma-scomo:1.0, and definitely, a position of a root node of the MO instance may also be determined according to saved corresponding relationship information of the MOI and a node position.

Through the preceding procedure, the terminal finds that the position of the SCOMO instance in the DM tree is ./SCOMO/1. Then, the terminal acquires the node information according to the node name in the preceding command. In this case, a Deployed node under a node ./SCOMO/1 is searched for. The terminal finds all Deployed nodes under the ./SCOMO/1 (only one Deployed node exists in this embodiment, and if multiple Deployed nodes exist, all of the Deployed nodes need to be found), and the terminal returns the names of all child nodes of the Deployed node to the server.

```
<Results>
<CmdRef>4</CmdRef>
<CmdID>7</CmdID>
   <Item>
      <Meta>
         <Format xmlns='syncml:metinf'>node</Format>
      </Meta>
         <Source><LocURI>./SCOMO/1/Inventory/De-
            ployed/1
</LocURI></Source>
   </Item>
   <Item>
      <Meta>
         <Format xmlns='syncml:metinf'>node</Format>
      </Meta>
         <Source><LocURI>./SCOMO/1/Inventory/De-
            ployed/2
</LocURI></Source>
   </Item>
</Results>
```

The preceding codes describe the information returned by the terminal device to the server. The information uses a Results command. In the command, multiple Items are used to carry the information about different nodes. An Item/Source/LocURI element carries absolute URIs of the child nodes of the Deployed node, that is, ./SCOMO/1/Inventory/Deployed/1 and ./SCOMO/1/Inventory/Deployed/2.

It should be noted that the absolute URIs in fact include the position of the SCOMO instance, that is, ./SCOMO/1. In this case, the terminal has only one SCOMO instance, and if multiple SCOMO instances exist, names of child nodes of Deployed nodes of the multiple instances need to be fed back.

Therefore, the server acquires the relevant information about the MO instance by sending one command. The information includes not only the position of the instance but also the names of the child nodes of a specified interior node in the MO instance.

In this embodiment, the node required to be acquired is specified by carrying the name of the interior node, and the interior node may also be specified by using a relative URI, where the relative URI is a relative path formed from a child node under a root node of an MO instance to a node required to be acquired.

As mentioned in the foregoing embodiments, the MOI and the relative URI may be used to acquire the information about the specified node in the MO instance. However, if a URI segment that the server does not know exists in the relative URI, that is, a node name that the server cannot determine exists, a corresponding method is required for handling (a node with a name that the server cannot determine is the aforementioned x node; the x node is named only when being instantiated by the server or the terminal; therefore, the server may not know the name of the x node; and the x node is also called a placeholder node or an unnamed node).

In this case, some symbols may be used in the relative URI to replace the nodes with names that the server does not know. As shown in FIG. 7B, if the server needs to acquire information about the ID node in the SCOMO instance, the following command may be sent:

```
<Get>
   <CmdID>4</CmdID>
   <Item>
      <Target>
         <LocURI>urn:oma:mo:oma-scomo:1.0?/Inventory/Deployed/
            <x>/ID
</LocURI>
      </Target>
   </Item>
</Get>
```

Similarly, the relative URI is also used to represent the node required to be acquired, and the relative URI refers to a path from the root node of the MO instance to the node required to be acquired, that is, ?/Inventory/Deployed/<x>/ID in FIG. 7B, and the root node, for example, ?/<x>/Inventory/Deployed/<x>/ID, of the MO instance may also be added. A difference from the foregoing embodiments lies in that, the child node of the Deployed node is represented by <x>, because for an unnamed node, the server may not know a name of the unnamed node after being instantiated. The present invention does not limit a symbol used to represent the x node, for example, the "*" or a reserved symbol specified in RFC2396 may also be used. In addition, in this embodiment, an "?" mark is added in the relative URI to clearly notify the terminal that the URI is a relative URI. The "?" mark is only a label, may not be a part of the relative URI, and is used only as a symbol for appending between the MOI and the relative URI. Definitely, the question mark may also be replaced with another symbol. In addition, as mentioned in the foregoing embodiments, the MOI and the relative URI may be carried by different elements.

Similar to the foregoing embodiments, after receiving the command, the terminal finds the ID node under all deployed nodes, and return URIs and node values of the ID nodes to the server. The specific description of the returning is not repeated herein.

In the case that names of child nodes of an interior node in the MO instance need to be acquired, if a relative URI required to be acquired also has an unknown node name, the node can be represented by using the preceding method.

In view of the preceding a method for providing node information includes receiving a command including an MOI and node object information and returning node information according to the MOI and the node object information in the command.

The node object information includes any one or any combination of node ID information and a node information parameter. The node ID information is a relative URI or a node name of a node. The relative URI includes a specified character. The specified character is used to represent a placeholder node or an unnamed node. The node object information includes the node ID information.

The returning the node information includes returning information of a node corresponding to the node ID information in an MO instance or returning information about a child node of a node corresponding to the node ID information in an MO instance. In either case, the MO instance corresponds to the MOI.

A method for acquiring node information includes sending a command including an MOI and node object information and receiving node information. The node information is returned according to the MOI and the node object information in the command. The node object information includes any one or any combination of node ID information and a node information parameter. Node ID information is a relative URI or a node name of a node, the relative URI includes a specified character. Specified character is used to represent a placeholder node or an unnamed node. The node object information includes the node ID information.

The receiving the node information, where the node information is returned according to the MOI and the node object information in the command includes receiving the information about the node corresponding to the node ID information in an MO instance, or receiving information about a child node of a node corresponding to the node ID information in an MO instance. In either case, the MO instance corresponds to the MOI.

Accordingly, the node ID information processed by the DM server and the terminal device described in the foregoing embodiments is a relative URI or a node name of a node.

The relative URI includes a specified character, and the specified character is used to represent a placeholder node or an unnamed node.

The DM server and the terminal device respectively implement the preceding method for acquiring node information.

A person skilled in the art may understand that all or a part of the steps of the methods according to the embodiments of the present invention may be implemented by a program instructing relevant hardware. The program may be stored in a computer readable storage medium. When the program is executed, the steps of the methods according to the embodiments of the present invention are performed. The storage medium may be any medium that is capable of storing program codes, such as a Read Only Memory (ROM), a Random Access Memory (RAM), a magnetic disk, and a Compact Disk-Read Only Memory (CD-ROM).

Finally, it should be noted that the foregoing embodiments are merely provided for describing the technical solutions of the present invention, but not intended to limit the present invention. It should be understood by ordinary person skilled in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A device management (DM) server, comprising:
a transmitter, configured to send a Get command of Open Mobile Alliance (OMA) DM for requesting node information associated with a target node to a terminal device, the Get command comprising a Management Object Identifier (MOI) and a relative uniform resource identifier (URI) of the target node which is relative to a root of a Management Object (MO) corresponding to the MOI; and
a receiver, configured to receive, from the terminal device, the node information requested by the Get command,
wherein the relative URI comprises a specified character, and the specified character represents a placeholder node or an unnamed node.

2. The DM server according to claim 1, wherein the node information of the target node includes a node value of the target node.

3. The DM server according to claim 1, wherein the node information of the target node includes an absolute uniform resource identifier (URI) of the target node.

4. The DM server according to claim 1, wherein the MOI is appended with "?".

5. The DM server according to claim 4, wherein the MOI appended with "?" and the relative URI are included in an Item/Data element within the Get command.

6. A device, comprising:
means for sending a Get command of Open Mobile Alliance (OMA) device management (DM) for requesting node information associated with a target node to a terminal device, the Get command comprising a Management Object Identifier (MOI) and a relative uniform resource identifier (URI) of the target node which is relative to a root of a Management Object (MO) corresponding to the MOI; and
means for receiving, from the terminal device, the node information requested by the Get command,
wherein the relative URI comprises a specified character, and the specified character represents a placeholder node or an unnamed node.

7. The device according to claim 6, wherein the node information of the target node includes a node value of the target node.

8. The device according to claim 6, wherein the node information of the target node includes an absolute uniform resource identifier (URI) of the target node.

9. The device according to claim 6, wherein the MOI is appended with "?".

10. The device according to claim 9, wherein the MOI appended with "?" and the relative URI are included in an Item/Data element within the Get command.

11. A method, comprising:
sending a Get command of Open Mobile Alliance (OMA) device management (DM) for requesting node information associated with a target node to a terminal device, the Get command comprising a Management Object Identifier (MOI) and a relative uniform resource identifier (URI) of the target node which is relative to a root of a Management Object (MO) corresponding to the MOI; and
receiving, from the terminal device, the node information requested by the Get command,
wherein the relative URI comprises a specified character, and the specified character represents a placeholder node or an unnamed node.

12. The method according to claim 11, wherein the node information of the target node includes a node value of the target node.

13. The method according to claim 11, wherein the node information of the target node includes an absolute uniform resource identifier (URI) of the target node.

14. The method according to claim 11, wherein the MOI is appended with "?".

15. The method according to claim 14, wherein the MOI appended with "?" and the relative URI are included in an Item/Data element within the Get command.

* * * * *

UNITED STATES PATENT AND TRADEMARK OFFICE
CERTIFICATE OF CORRECTION

PATENT NO. : 9,712,403 B2  
APPLICATION NO. : 14/248937  
DATED : July 18, 2017  
INVENTOR(S) : Yue Song Page 1 of 1

It is certified that error appears in the above-identified patent and that said Letters Patent is hereby corrected as shown below:

On the Title Page

Item (73) Assignee, Line 1, delete "Huawei Technologies Co., Ltd.," and insert --Huawei Device Co., Ltd.,--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*